Nov. 19, 1963 R. E. MILFORD 3,111,645

WAVEFORM RECOGNITION SYSTEM

Filed May 1, 1959 3 Sheets-Sheet 1

INVENTOR.
RICHARD E. MILFORD.
BY [signature]
ATTORNEY.

INVENTOR.
RICHARD E. MILFORD.
BY Louis P. Elbinger
ATTORNEY.

Nov. 19, 1963 R. E. MILFORD 3,111,645

WAVEFORM RECOGNITION SYSTEM

Filed May 1, 1959 3 Sheets-Sheet 3

INVENTOR.
RICHARD E. MILFORD.
BY [signature]
ATTORNEY.

3,111,645
WAVEFORM RECOGNITION SYSTEM
Richard E. Milford, Glendale, Ariz., assignor to General Electric Company, a corporation of New York
Filed May 1, 1959, Ser. No. 810,281
19 Claims. (Cl. 340—146.3)

The present invention pertains to an improved system for waveform recognition by electronic apparatus and particularly to an improved correlation network in a system for waveform recognition by an electronic apparatus.

In the art of reading printed symbols of the human language by electronic apparatus, it has been the practice to scan a printed symbol to obtain a unique signal waveform. If the symbol is printed with ink containing magnetized material, or material capable of being magnetized prior to scanning, it may be scanned by electromagnetic sensing means. The unique waveform obtained is first recognized and then identified with a unique digital signal representing the symbol scanned.

A novel way of electronically recognizing and identifying waveforms derived by scanning unique symbols in an automatic reading system is disclosed in a copending application Serial No. 693,773, filed October 31, 1957, now Patent No. 2,924,812, by Philip E. Merritt and Carroll M. Steele, assignors to the assignee of the instant application. In that system a unique waveform to be recognized is first stored in a delay line as a traveling wave so that distinct signal samples of the waveform may be applied simultaneously to a plurality of correlation networks which together comprise a waveform recognition system. A corresponding correlation network is provided for each different waveform that is to be recognized. Each correlation network is an electronic circuit adapted to provide an output signal greater than any other signal provided by the other correlation networks when signal samples of a corresponding waveform are applied simultaneously to all of the networks. The output signal derived from a correlation network in response to signal samples of its corresponding waveform is referred to as an auto-correlation signal. The signals derived from the other correlation networks in response to the same signal samples of a waveform are referred to as cross-correlation signals. All of these correlation signals are applied to a peak detector and comparator circuit to identify which signal is the greatest and to provide a digital signal at a corresponding one of a number of terminals. In that manner the waveform is recognized by its corresponding correlation network and identified by the peak detector and comparator circuit.

Each correlation network in that system includes a plurality of voltage divider circuits adapted to multiply the amplitude of a distinct waveform sample voltage by a value that is proportional to the amplitude of a voltage that would be sampled if the corresponding waveform were to be recognized. The product voltages are then combined and multiplied in an additional voltage divider circuit by a factor that is inversely proportional to the energy content of the waveform which corresponds to the correlation network.

From the foregoing, it may be seen that the concept of waveform recognition by correlation techniques is not only explained and established in the aforementioned copending application, but also that an electronic system for implementing that concept is disclosed. The present invention is an improvement over the correlation network of that application in that the two multiplication factors for each signal sample are combined into a single element. Thus, instead of having one voltage divider for each sample voltage and a further voltage divider for the combined voltages, there is provided instead a single impedance element for multiplying the currents of each signal sample. A novel current summing amplifier circuit is then used for combining the multiplied currents to provide a correlation signal.

The principal object of this invention is to provide a novel correlation network of simple construction having a minimum number of parts.

A further object is to provide a correlation system that may be easily adapted to recognize new or different waveforms.

Another object of this invention is to provide a correlation network which provides a correlation signal in a facile manner from either positive or negative sample voltages, or from both positive and negative sample voltages.

Still another object is to provide a novel current summing amplifier circuit which provides the sum of the absolute values of both positive and negative signals.

These and other objects of this invention may be realized through the provision of a current summing amplifier circuit consisting of two current summing amplifiers connected in cascade and a plurality of impedance elements connecting signal samples of a waveform to be recognized of one polarity to a first one of the two current summing amplifiers and signal samples of the other polarity to a second one of the two current summing amplifiers. For auto-correlation, the first current summing amplifier combines and inverts the signal samples of one polarity; the second current summing amplifier combines the inverted combination signal from the first current summing amplifier with the signal samples of the opposite polarity and inverts them. The output of the second current summing amplifier is the sum of the absolute values of the signal samples applied to the current summing up amplifier circuit. The quantity of impedance of each impedance element is inversely proportional to the signal sample voltage applied to it when the corresponding waveform to be recognized is sampled and directly proportional to the energy content of that corresponding waveform. The foregoing constitutes an auto-correlation network for recognizing a corresponding waveform. As many correlation networks as there are different waveforms to be recognized are provided to constitute a waveform recognition system.

The features of this invention believed to be novel are set forth with particularity in the appended claims. The invention itself, however, may best be understood by reference to the following description taken in connection with the accompanying drawings wherein:

FIG. 1 is a schematic block diagram illustrating a symbol reading apparatus.

FIGS. 2, 2*a* and 3 are graphs of symbol waveforms stored in a delay line as traveling waves.

Figure 4:
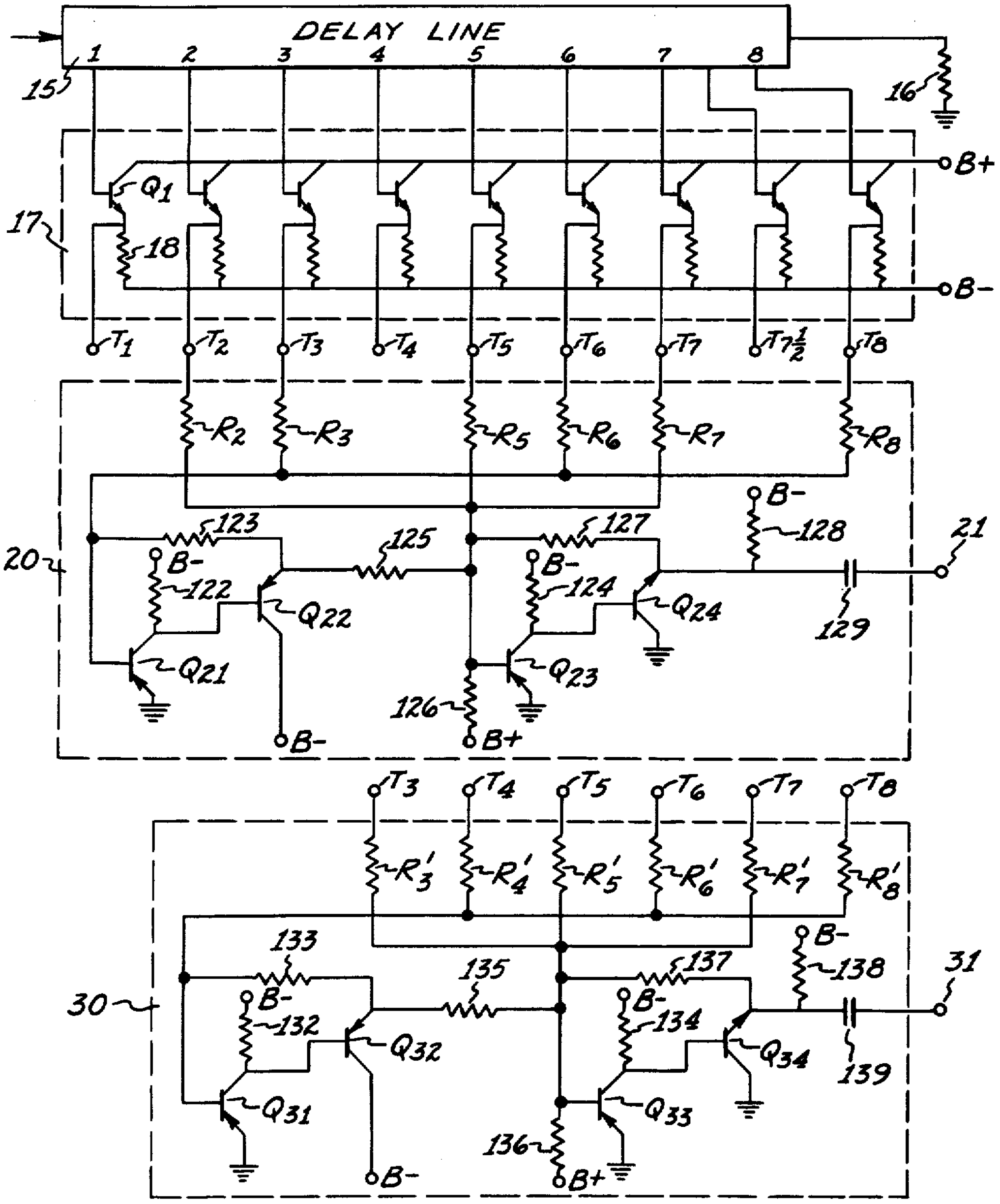
FIG. 4 illustrates in a circuit diagram a system of correlation networks according to the present invention.

The operation of an automatic symbol reading apparatus will first be described with reference to the schematic diagram of FIG. 1 after which the correlation networks of that apparatus according to the concept of the present invention will be described with reference to the circuit diagram of FIG. 4. Then the apparatus which identifies the waveforms will be described with reference to the circuit diagram of FIG. 5 so that the function of the correlation networks may be more fully understood.

Figures 1, 2, 2A, 3:
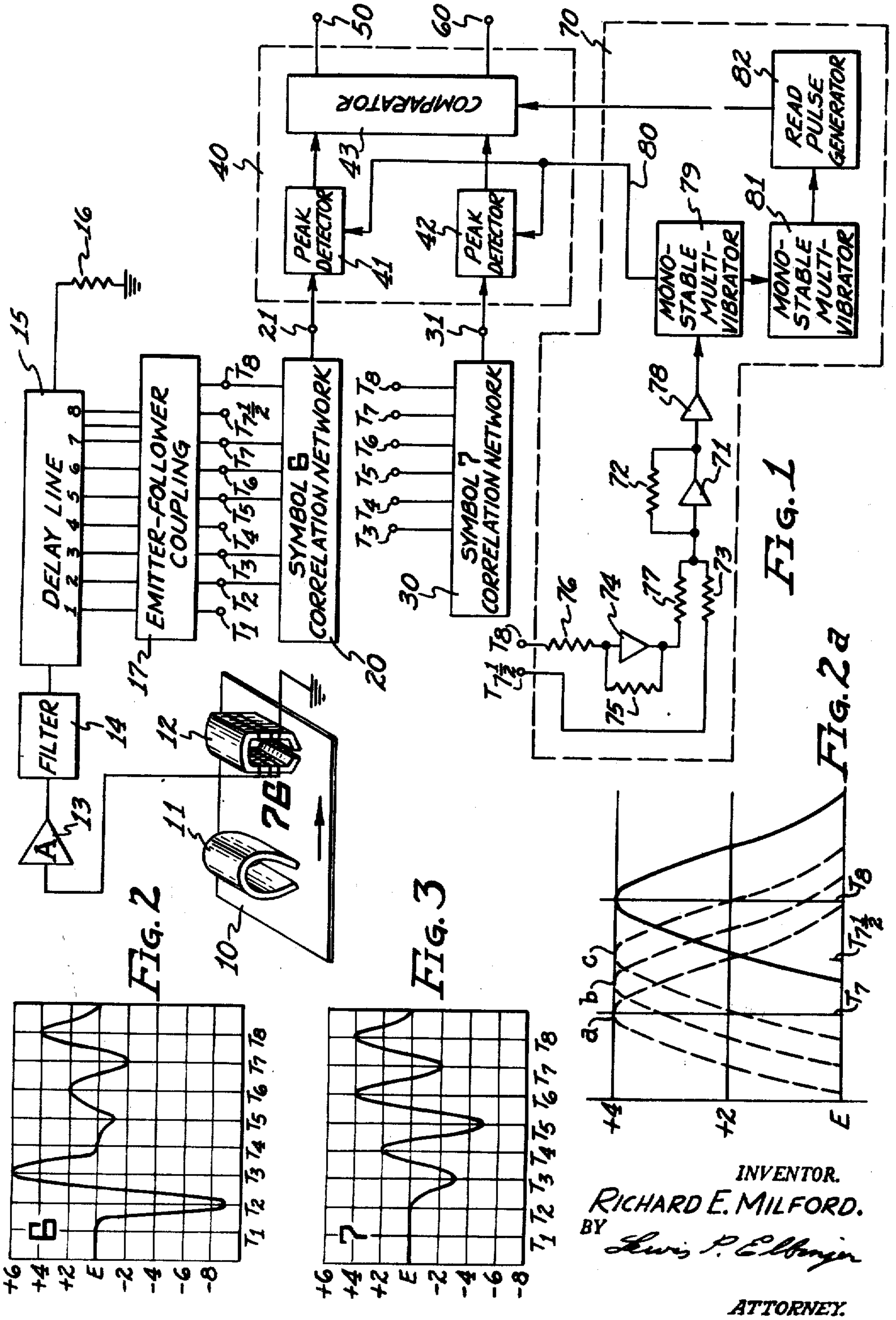

Referring to FIG. 1, the symbols 6 and 7 which are to be read in the illustrated apparatus are printed on a document 10 with a substance containing material capable of being magnetized. In the process of reading, the document 10 is moved at an approximately constant rate such that the printed symbols first pass by a permanent magnet 11 which magnetizes the material and then pass by by a magnetic transducer 12 which senses the magnetized material and produces corresponding waveforms.

The waveforms produced by the transducer 12 are then passed by an amplifier 13 and low pass filter circuit 14 to a delay line 15 where they are stored as traveling waves. The delay line 15 is terminated by a resistor 16 having a resistance value equal to the value of the characteristic impedance of the delay line 15 so that there will be no reflection of successive voltage amplitudes.

The delay line 15 is provided with eight equally spaced taps coupled to terminals $T_1$ to $T_8$ by an emitter-follower coupling circuit 17. A ninth tap intermediate the seventh and eighth taps is also coupled to a terminal $T_{7\,1/2}$ by the emitter-follower coupling circuit 17. Each voltage amplitude of the waveform produced by the transducer 12 is successively stored in the delay line 15 such that when the entire waveform has been produced it is stored as a traveling wave which can be sampled at several points simultaneously.

Graphs of traveling waves corresponding to waveforms produced by sensing the symbols 6 and 7 on the document 10 of FIG. 1 are shown in FIGS. 2 and 3 respectively. The waves are depicted at the time when the leading voltage peak appears at terminal $T_8$. The corresponding voltage amplitude at each terminal is plotted as the ordinate, but it should be noted that the reference voltage E is arbitrary and that the ordinates have not been assigned units of voltage because, as it will presently be seen, only relative voltages are important. The abscissas of the graphs are the terminals $T_1$ to $T_8$ coupled to the delay line.

When the waveforms of the symbols 6 and 7 are stored as traveling waves in the delay line 15 in the position defined by the respective graphs of FIG. 2 and FIG. 3, they are stored in a position which will hereafter be referred to as the reference position. If other waveforms were to be recognized, the reference position for each would be similarly defined as that position in the delay line 15 when the leading peak voltage is present at terminal $T_8$. Continuously changing signal samples of the traveling wave are presented at the terminals $T_1$ to $T_8$ but, as will be more fully explained, only those signal samples present at terminals $T_1$ to $T_8$ when the waveform to be recognized is in the reference position are important.

The signals which appear at certain of the terminals $T_1$ to $T_8$ are applied simultaneously to the symbol 6 correlation network 20 and the symbol 7 correlation network 30 in a manner to be more fully described. Only those two correlation networks are shown because, for illustration purposes, waveforms derived from only two different symbols are to be recognized. An additional correlation network would be added to recognize additional symbols.

The correlation network 20 is designed to recognize the waveform derived by sensing the symbol 6. When signal samples of that waveform are applied to that correlation network, a signal is obtained at terminal 21. That signal reaches its maximum amplitude when the waveform is stored in its reference position and is referred to as an auto-correlation signal.

Since signal samples of the symbol 6 waveform are also applied to the correlation network 30, a signal is produced by that network which will reach a maximum amplitude at terminal 31. That signal is referred to as a cross-correlation signal. It may or may not reach a maximum amplitude at the same time that the auto-correlation signal does but it will always be less in amplitude because it is obtained from a network designed to recognize a symbol 7 waveform.

Accordingly, it is to be understood that the correlation network 20 recognizes the symbol 6 waveform by producing an auto-correlation signal at terminal 21 which is a signal having a greater voltage amplitude than a signal produced by any other network designed to recognize a different symbol waveform. In a similar manner the correlation network 30 recognizes the symbol 7 waveform by producing an auto-correlation signal at terminal 31 which is a signal having a greater voltage amplitude than a signal produced by any other network designed to recognize a different symbol waveform.

A peak detector and comparator circuit 40 identifies the waveform recognized in the correlation system by producing a signal at terminal 50 or 60 according to whether the signal at terminal 21 or 31 is the auto-correlation signal, namely the correlation signal having the greatest amplitude. Peak detectors 41 and 42 detect and store the maximum amplitude of the correlation signals at terminals 21 and 31 so that, after the auto-correlation signal has reached its maximum amplitude, the comparator 43 may identify the waveform recognized by comparing stored correlation signal amplitudes.

The manner in which the peak detector and comparator circuit 40 is synchronized will now be described. The peak detectors 41, 42 and the comparator 43 are normally held inoperative. A long pulse obtained from the symbol waveform presence detecting and synchronizing circuit 70 is applied to each detector to render it operative for an interval of time from an instant just before the symbol waveform is stored in its reference position until after it is certain the symbol waveform is no longer stored in the delay line. Shortly after the symbol waveform is stored in its reference position, a short pulse obtained from the symbol waveform presence detecting and synchronizing circuit 70 is applied to the comparator 43 to render it operative.

Thus, the peak detector and comparator circuit 40 operation is timed in relation to the presence of a waveform stored as a traveling wave in its reference position which has been previously defined as that position in the delay line 15 when the leading peak voltage of the wave is present at terminal $T_8$ as shown in FIGS. 2 and 3. Therefore, the presence of the wave in the delay line must be detected before the leading peak voltage reaches the tap to which terminal $T_8$ is coupled.

The waveform is detected before it is stored in its reference position by detecting the positive slope of the first positive going excursion at terminal $T_8$. This is done by connecting terminal $T_{7\,1/2}$ to a current summing amplifier 71 having a feedback resistor 72 through a resistor 73 having an impedance value equal to approximately three times that of resistor 72 and connecting terminal $T_8$ to a current summing amplifier 74 having a feedback resistor 75 through a resistor 76 having a resistance value equal to that of resistor 75 which in turn has a resistance value equal to that of resistor 72. The output of the current summing amplifier 74 is connected to the input of the current summing amplifier 71 through a resistor 77 having an impedance value equal to that of resistor 72. The output of the waveform presence detector is taken from the output of the current summing amplifier 71 and is given by $$(1)\qquad X_0 \simeq -\left[\frac{R_0}{R_1}X+\frac{R_0}{R_2}\left(-\frac{R_0'}{R_1'}X'\right)\right]$$

where $R_0$=resistance value of resistor 72;
$R_1$=resistance value of resistor 73;
$R_2$=resistance value of resistor 77;
$R_0'$=resistance value of resistor 75;
$R_1'$=resistance value of resistor 76;
$X$=voltage at terminal $T_{7\,1/2}$; and
$X'$=voltage at terminal $T_8$.

Since $R_0$, $R_2$, $R_0'$ and $R_1'$ are equal and $R_1$ is approximately equal to three times $R_0$ the above expression for $X_0$ may be written as $$(2)\qquad X_0 \simeq X' - \tfrac{1}{3}X$$

FIG. 2*a* illustrates in a graph the first positive excursion of the traveling wave of FIG. 2 in several positions in the delay line 15. The solid line curve illustrates its position when the waveform is stored in its reference position. The dotted line curves *a*, *b* and *c* illustrate three successive positions of the first positive excursion as it travels from the tap to which terminal $T_7$ is connected to the tap to which $T_8$ is connected.

By substituting in the foregoing expression for $X_0$ the successive values of the voltage at terminals $T_8$ and $T_{7\ 1/2}$ taken from the dotted curves *a* to *c*, it can be seen that the waveform presence output signal $X_0$ is first negative with respect to a reference and then positive. It crosses the reference when the positive excursion of the traveling wave is in a position between that shown by the dotted curve *b* and the position shown by the dotted curve *c*.

The precise time at which $X_0$ crosses the reference level and becomes positive will depend on the slope of the leading part of the first positive excursion which in turn depends on the shape of the printed symbol scanned by the transducer 12. Fairly uniform results may be obtained if every symbol to be read by the system is designed to have a vertical leading edge of a fairly uniform height. In that manner a fairly consistent slope for the leading part of the first positive excursion is provided for every symbol waveform. This design technique is illustrated in the present symbol reading system for the symbols 6 and 7 shown.

The first positive-going signal from the current summing amplifier 71 is the waveform presence signal used to time the operation of the peak detector and comparator circuit 40. An overdriven amplifier 78 amplifies and clips the waveform presence signal to provide a large signal with a steep leading edge. That steep leading edge triggers a timing monostable multivibrator 79 into its quasi-stable state to provide a pulse having a fixed time interval that enables the peak detectors 41 and 42 to detect and store the maximum voltage amplitude of the correlation signals at terminals 21 and 31. The duration of the fixed time interval is established such that the multivibrator 79 cannot be triggered again by subsequent signals from the amplifier 78 produced in response to other positive excursions of the same traveling wave passing by terminals $T_{7\ 1/2}$ and $T_8$.

From the foregoing it can be seen that the operation of the peak detectors 41 and 42 is timed to start before the waveform to be recognized and identified is stored in the delay line 15 in its reference position. This insures detecting the maximum voltage amplitude of the autocorrelation signal so that it may be compared with corresponding cross-correlation signals for identification by the comparator 43. The voltage amplitudes detected are stored until the monostable multivibrator 79 resets.

The stored voltage amplitudes are compared shortly after the stored waveform has reached its reference position by the comparator 43 at a time determined by a monostable multivibrator 81 which triggers a read pulse generator 82. The multivibrator 81 is triggered into its quasi-stable state by the leading edge of the pulse from the monostable multivibrator 79. The duration of the fixed time interval of the multivibrator 81 is adjusted so that it will terminate at the time that the operation of the comparator 43 is to begin. The trailing edge of the pulse from the multivibrator 81 is then differentiated to provide a trigger pulse for the read pulse generator 82, which in turn provides a read pulse of short duration that is applied to the comparator 43.

During the presence of the read pulse, the comparator 43 provides a direct voltage output signal at either terminal 50 or 60 depending upon whether the peak detector 41 or the peak detector 42 is storing the greatest signal amplitude. If more than two correlation networks are provided, each with a corresponding peak detector, the comparator 43 will still provide an output signal at whichever terminal corresponds with the peak detector storing the greatest voltage amplitude. Thus, the peak detector and comparator circuit identifies the waveform recognized in the correlation system by providing a direct voltage signal at a corresponding output terminal.

A correlation network system according to the present invention for an automatic symbol reading apparatus will now be described with reference to the circuit diagram of FIG. 4. The correlation networks 20 and 30 are coupled to the delay line 15 by an emitter-follower circuit 17 which comprises a plurality of NPN transistors $Q_1$, each having its collector connected to a suitable source of positive direct voltage, its base connected to one of the delay line taps and its emitter connected to a suitable source of negative direct voltage through a resistor 18. The emitter of each transistor $Q_1$ is further connected to one of a plurality of terminals $T_1$ to $T_8$ which are connected to the correlation networks 20 and 30. It should be noted that every terminal $T_1$ to $T_8$ is not connected to both correlation networks. For example, terminal $T_1$ is not connected to either correlation network 20 or 30 and terminal $T_2$ is connected only to the correlation network 20. The reason some connections are omitted between terminals $T_1$ to $T_8$ and the correlation networks 20 and 30 will be explained as the description of the present invention progresses.

The correlation network 20 which is designed to recognize the symbol 6 waveform will be described first. It comprises a novel current summing amplifier circuit which includes three PNP transistors $Q_{21}$, $Q_{22}$, $Q_{23}$ and an NPN transistor $Q_{24}$. Two current summing amplifiers actually exist in this circuit. The first includes transistors $Q_{21}$ and $Q_{22}$ while the second includes transistors $Q_{23}$ and $Q_{24}$.

In the first current summing amplifier, the transistor $Q_{21}$ is connected in a common-emitter amplifier configuration; the emitter is connected to a reference potential or ground and the collector is connected to a source of negative direct voltage through a resistor 122. Input current signals are connected to the base of transistor $Q_{21}$ in a manner to be described. Transistor $Q_{22}$ is connected in a common-collector emitter-follower configuration; the emitter is connected to the base of transistor $Q_{21}$ by resistor 123 and the collector is connected to a source of negative direct voltage. The base of transistor $Q_{22}$ is connected to the collector of transistor $Q_{21}$. A voltage signal proportional to the sum of the several input current signals applied to the base of transistor $Q_{21}$ is obtained at the emitter of transistor $Q_{22}$.

In the second current summing amplifier, the transistor $Q_{23}$ is also connected in a common-emitter amplifier configuration; the emitter is connected to a reference potential or ground and the collector is connected to a source of negative direct voltage through a resistor 124. The voltage signal obtained at the emitter of transistor $Q_{22}$ is connected to the base of transistor $Q_{23}$ through a coupling resistor 125. Other input current signals are applied to the base of the transistor $Q_{23}$ in a manner to be described. The base of the transistor $Q_{23}$ is also connected to a source of positive direct voltage through a resistor 126 to prevent the transistor $Q_{23}$ from being driven to saturation during normal operation. The NPN transistor $Q_{24}$ is connected in a common-collector emitter-follower configuration; the emitter is connected to the base of transistor $Q_{23}$ through a feedback resistor 127 having a value of resistance equal to that of the coupling resistor 125 and to a source of negative direct voltage through resistor 128. A voltage signal proportional to the sum of the several input current signals applied to the base of transistor $Q_{23}$ is obtained at the emitter of transistor $Q_{24}$ and coupled to the output terminal 21 by a capacitor 129.

It is desirable that the circuitry of the voltage peak detector 41 connected to the terminal 21 reach its maximum voltage as quickly as possible when a correlation signal is applied to the terminal 21. Since there is capacitance in that circuitry which must be charged before the voltage maximum may be reached, the response time must be improved by providing a low impedance path for the charging current when positive going correlation signals are applied to terminal 21. To provide that low impedance path, an NPN type of transistor is used in the output emitter-follower circuit. That provides a low impedance path for charging current through the collector-to-emitter circuit of transistor $Q_{24}$; otherwise, the output emitter-follower transistor $Q_{24}$ could be of the PNP type connected in a manner similar to the emitter-follower transistor $Q_{22}$.

The manner in which the current summing amplifier circuit is connected to certain of the terminals $T_1$ to $T_8$ will now be described. Since the correlation network 20 is designed in a manner to be described so as to recognize the symbol 6 waveform when it is stored in the delay line 15 in its reference position, it is to be assumed that the relative voltages indicated in the graph of FIG. 2 are present at terminals $T_1$ to $T_8$. These relative voltages are 0, −9, +6, 0, −1, +2, −2 and +4, respectively. As noted before, the ordinates of the graph have not been assigned units of voltage; this is because all voltages may be multiplied by an arbitrary constant without affecting the end result of the waveform recognition system. The truth of this statement will presently be verified.

Terminals $T_1$ to $T_8$ are in turn connected to the base of transistors $Q_{21}$ and $Q_{23}$ according to whether the voltage at each terminal is positive or negative with respect to the reference E. If the relative voltage is zero, as at terminals $T_1$ and $T_4$, the terminal is not connected to either current summing amplifier because, as it will be seen, a zero signal sample makes no contribution to the end result of the recognition system. The sample voltages at terminals $T_3$, $T_6$ and $T_8$ are relatively positive; accordingly, they are connected to the base of transistor $Q_{21}$ by coupling resistors $R_3$, $R_6$ and $R_8$. The sample voltages at terminals $T_2$, $T_5$ and $T_7$ are relatively negative and therefore are connected to the base of the transistor $Q_{23}$ by coupling resistors $R_2$, $R_5$ and $R_7$.

The coupling resistors are designed to multiply the sample signals of the waveform stored in the delay line by predetermined constants. The current summing amplifier circuit combines and inverts the positive sample signals in the first current summing amplifier. The second current summing amplifier of the circuit then combines the negative sample signals with the combined and inverted signal of the positive sample signals and inverts the total combined signal.

The particular factor by which each sample voltage is to be multiplied is introduced into the circuit by designing each coupling resistor to have a resistance value inversely proportional to that particular factor relative to the respective feedback resistor 123 or 127 in the first or second current summing amplifier. For example, if the resistance value of resistor 123 is 1,000 ohms and the multiplier for the sample voltage at terminal $T_3$ is to be 4, the value of resistance for resistor $R_3$ should be 250 ohms. A more detailed description of the use of a current summing amplifier with feedback for multiplying several voltages which are to be added, each by a different constant, is given in Electronic Analog Computers by G. A. Korn et al. (McGraw-Hill Book Co., New York, 1952), at pages 13 and 14.

The particular factor introduced by each resistor in the symbol 6 correlation network 20 is designed to be a particular constant inversely proportional to the signal sample of the symbol 6 waveform obtained when it is in its reference position and directly proportional to the energy content of the symbol 6 waveform. From the graph of the symbol 6 waveform it is seen that the signal samples at terminals $T_2$, $T_3$, $T_5$, $T_6$, $T_7$ and $T_8$ are −9, +6, −1, +2, −2 and +4, respectively, and that the sum of the square of all the sampled voltages is equal to 142.

Before describing further how the resistance value of the coupling resistors are determined for the symbol 6 correlation network 20, it is necessary to describe at least one other correlation network in the system, the illustrated symbol 7 correlation network 30 which is the same as the correlation network 20 except that its coupling resistors are designed to recognize the symbol 7 waveform. The correlation network 30 is connected to the terminals $T_1$ to $T_8$ in a manner similar to that described for the correlation network 20. From the graph of FIG. 3 it is seen that the relative signal samples presented at terminals $T_1$ to $T_8$ when the symbol 7 waveform is stored in the delay line in its reference position are 0, 0, −3, +2, −5, +4, −2 and +4. The first two terminals, $T_1$ and $T_2$, have a zero signal sample and are therefore not connected to the current summing amplifier circuit. Terminals $T_4$, $T_6$ and $T_8$ have positive signal samples and are therefore connected to the base of a transistor $Q_{31}$ in the first current summing amplifier by resistors $R_4'$, $R_6'$ and $R_8'$, respectively. The terminals $T_3$, $T_5$ and $T_7$ have negative signal samples and are therefore connected to the base of a transistor $Q_{33}$ in the second current amplifier by resistors $R_3'$, $R_4'$ and $R_7'$, respectively.

The particular factor introduced by each coupling resistor in the symbol 7 correlation network 30 is determined as in the symbol 6 correlation network so that each signal sample of the symbol 7 waveform obtained when it is in the reference position is multiplied by a constant which is inversely proportional to the signal sample and directly proportional to the energy content of the symbol 7 waveform sampled. The energy content of the symbol 7 waveform is proportional to the sum of the square of all the signal samples; that sum is equal to 74.

The energy content of any symbol waveform is proportional to the sum of the squares of all the signal samples when it is stored in its reference position. A general expression for that sum is $$\sum_{i=1}^{8} E_i^2$$

where $E_i$ is the sample voltage at terminal $T_i$ when the symbol waveform for any unique symbol is stored in the delay line in its reference position. Thus, the foregoing discussion may be generalized and applied to a recognition system having correlation networks for recognizing any number of different waveforms. If, for example, ten different waveforms are to be recognized by a system which includes a correlation network for each symbol, such as symbols representing the numerals 1 to 10, a table of relative signal samples and the sum of their squares may be tabulated as follows:

TABLE I

*Relative Signal Samples*

| Printed Symbol | $T_1$ | $T_2$ | $T_3$ | $T_4$ | $T_5$ | $T_6$ | $T_7$ | $T_8$ | Sum of Squares |
|---|---|---|---|---|---|---|---|---|---|
| 0 | −7 | +6 | 0 | 0 | 0 | 0 | −6 | +7 | 170 |
| 1 | 0 | 0 | 0 | −5 | −3 | +5 | 0 | +4 | 75 |
| 2 | 0 | 0 | 0 | −6 | +3 | 0 | −3 | +6 | 90 |
| 3 | 0 | 0 | −3 | 0 | 0 | −6 | +5 | +5 | 95 |
| 4 | 0 | −7 | 0 | +6 | 0 | −3 | 0 | +4 | 110 |
| 5 | 0 | 0 | −6 | +3 | 0 | 0 | −3 | +6 | 90 |
| 6 | 0 | −9 | +6 | 0 | −1 | +2 | −2 | +4 | 142 |
| 7 | 0 | 0 | −3 | +2 | −5 | +4 | −2 | +4 | 74 |
| 8 | −4 | −4 | +6 | 0 | 0 | −6 | +4 | +4 | 136 |
| 9 | 0 | −5 | +3 | 0 | 0 | −4 | −3 | +9 | 140 |

From the foregoing table it can be seen by comparing the sum of the squares for each symbol that the relative energy content of each corresponding waveform stored in the delay line 15 and sampled at the terminals $T_1$ to $T_8$ is different. The sum 170 for the symbol zero is the largest while the sum 74 for the symbol 7 is the smallest. The sum 142 for the symbol 6 is conveniently between those two extremes. Therefore, the sum of the squares of the signal samples of each symbol is normalized to the sum 142 by multiplying each signal sample by a factor equal to the square root of the ratio of 142 to the sum of the squares of the signal samples to be normalized. A general algebraic expression for this step is given by $$E_i' = E_i \sqrt{\frac{142}{\sum_{i=1}^{8} E_i^2}} \tag{3}$$

$E_i$=signal at terminal $T_i$.
$E_i'$=normalized amplitude of signal at terminal $T_i$.

$\sum_{i=1}^{8} E_i^2$=the sum of the squares of all the signal samples of the symbol waveform.

For example, to normalize the energy of the weakest symbol to 142, each signal sampled for the symbol 7 is multiplied by the square root of the ratio 142/74. The approximate normalized signal samples are shown in the following table.

*Normalized Signal Samples*

| Printed Symbol | $T_1$ | $T_2$ | $T_3$ | $T_4$ | $T_5$ | $T_6$ | $T_7$ | $T_8$ | Sum of Squares |
|---|---|---|---|---|---|---|---|---|---|
| 7 | 0 | 0 | −4.15 | +2.77 | −6.93 | +5.54 | −2.77 | +5.54 | 142 |

It should be noted that 142, the sum of the squares of the symbol 6 waveform signal samples, was arbitrarily used as a convenient relative energy content value to which all waveforms sampled should be normalized. Any other arbitrary value could be selected.

After all of the signal samples have been multiplied by the normalizing factor, the value of resistance of the coupling resistors in each corresponding correlation network are designed to be inversely proportional to the corresponding normalized signal sample. Thus, the respective resistors $R_2$, $R_3$, $R_5$, $R_6$, $R_7$ and $R_8$ for the symbol 6 correlation network 20 have a value of resistance equal to K/9, K/6, K, K/2, K/2 and K/4 and the respective resistors $R_3'$, $R_4'$, $R_5'$, $R_6'$, $R_7'$ and $R_8'$ for the symbol 7 correlation network 30 have a value of resistance equal to K/4.15, K/2.77, K/6.93, K/5.54, K/2.77 and K/5.54. The value of resistance for any coupling resistor $R_i$ connected to a terminal $T_i$ in a symbol A correlation network is given by $$R_i = \frac{K}{a_i \sqrt{\frac{\sum_{i=1}^{8} z_i'^2}{\sum_{i=1}^{8} a_i^2}}} \tag{4}$$

where $K$=arbitrary constant;
$a_i$=signal sample at terminal $T_i$ when the symbol A waveform is stored in the delay line in its reference position, the symbol A waveform being any arbitrary waveform;

$\sum_{i=1}^{8} a_i^2$=sum of the squares of the signal samples of the symbol A waveform which is to be normalized and $\sum_{i=1}^{8} z_i'^2$=sum of the squares of the signal samples of a symbol Z waveform to which all waveforms are to be normalized, the symbol Z waveform being any other arbitrary waveform. However, this sum may be any arbitrary constant and need not correspond with any of the waveforms to ce recognized It has been stated that terminals $T_1$ and $T_4$ are not connected to the symbol 6 correlation network 20 since the signal sample at each of those terminals is zero with respect to the reference E when the symbol 6 waveform is stored in its reference position. The reason given is that a zero signal sample makes no contribution to the output signal of the correlation network. The truth of this statement may be verified by using the general expression above for determining the value of resistance for coupling resistors which would be connected to terminals $T_1$ and $T_4$. The value of resistance in each instance would be $$R_{1,4} = \frac{K}{0\sqrt{\frac{142}{142}}} \rightarrow \infty \tag{5}$$

Since the resistance required in each instance would effectively be an infinite amount, an open circuit is provided between the correlation network 20 and the terminals $T_1$ and $T_4$. In a similar manner it is determined that an open circuit should be provided between the correlation network 30 and the terminals $T_1$ and $T_2$.

The structure of a correlation system according to the present invention having been described with reference to the two illustrative correlation networks 20 and 30, the operation of such a system will now be described. For that purpose it will be assumed that the symbol 7 waveform is to be recognized; that it is stored in the delay line 15 in its reference position; and that relative signal samples are present at terminals $T_1$ to $T_8$ as shown in FIG. 3. The auto-correlation signal at terminal 31 will be determined first after which the cross-correlation signal at terminal 21 will be determined. A comparison of the correlation signals will then verify that the correlation network 30 does recognize the symbol 7 waveform by producing an auto-correlation signal having a greater amplitude than the cross-correlation signal.

The relative signal samples at terminals $T_4$, $T_6$ and $T_8$ are +2, +4 and +4 with respect to a reference E. The true signals at those terminals may be expressed as +2M, +4M and +4M, respectively, where M is any arbitrary gain factor provided by the waveform sampling system which includes the amplifier 13 and filter 14 in addition to the delay line 15 and emitter-follower circuit 17. In a similar manner, the true signals at terminals $T_3$, $T_5$ and $T_7$ may be expressed as −3M, −5M and −2M.

The relatively positive sample voltages at terminals $T_4$, $T_6$ and $T_8$ produce an increase of current through the respective resistors $R_4'$, $R_6'$ and $R_8'$ toward the base of the transistor $Q_{31}$. This increase of current in the base of transistor $Q_{31}$ drives the collector of transistor $Q_{31}$ more negative. Since the base of transistor $Q_{31}$ is directly connected to the collector of $Q_{31}$, the emitter-to-collector current in transistor $Q_{32}$ is increased and the emitter of transistor $Q_{32}$ is driven more negative. The feedback resistor 133 is connected to the junction between the base of transistor $Q_{31}$ and the coupling resistors $R_4'$, $R_6'$ and $R_8'$. Since the sum of the currents at that junction must equal zero, the feedback current through the resistor 133 away from the junction increases until that increase approaches the sum of the increase of currents through the resistors $R_4'$, $R_6'$ and $R_8'$ toward the junction. The change of the emitter potential of transistor $Q_{32}$ is proportional to the sum of the input currents to the base of transistor $Q_{31}$ through the resistors $R_4'$, $R_6'$ and $R_8'$ but inverted in phase.

The relatively negative signal samples at terminals $T_3$, $T_5$ and $T_7$, on the other hand, produce an increase of current through the respective resistors $R_3'$, $R_5'$ and $R_7'$ away from the base of the transistor $Q_{33}$. This increase of current in the base of transistor $Q_{33}$ drives the collector of transistor $Q_{33}$ and the base of transistor $Q_{34}$ less negative. In a manner similar to the operation of the first current summing amplifier comprising transistors $Q_{31}$ and $Q_{32}$, the change in potential of the base of transistor $Q_{34}$ will cause a decrease of current through the feedback resistor 137 away from the base of transistor $Q_{33}$ which is equal to the sum of the increase of currents through $R_3'$, $R_5'$ and $R_7'$ away from the base of transistor $Q_{34}$. The change of the emitter potential of transistor $Q_{34}$ is proportional to the sum of the input currents to the base of transistor $Q_{33}$ through the resistors $R_3'$, $R_5'$ and $R_7'$ but inverted in phase. There is an additional input current away from the base of transistor $Q_{33}$ through resistor 135 due to the increase in negative potential of the emitter of transistor $Q_{32}$ which is produced by input currents through the resistors $R_4'$, $R_6'$ and $R_8'$. This additional input current further decreases the feedback current through resistor 137 away from the base of transistor $Q_{33}$. Since the resistor 135 has a value of resistance equal to that of the resistor 137, the change in potential at the emitter of transistor $Q_{32}$ causes an equal change in potential at the emitter of transistor $Q_{34}$ but opposite in phase.

The change in the emitter potential of transistor $Q_{34}$ is coupled to the output terminal 31 by the capacitor 139. That change in potential is proportional to the sum of the input signals to the base of the transistors $Q_{31}$ and $Q_{33}$. Each signal input is in turn proportional to the product of the voltage samples at the terminals $T_3$ to $T_8$ and the value of resistance of each corresponding resistor $R_3'$ to $R_8'$.

The auto-correlation output signal $E_{31}$ at the terminal 31 will now be determined by first calculating the output signal $E_{32}$ at the emitter of transistor $Q_{32}$ and then combining that signal $E_{32}$ with the input signals at terminals $T_3$, $T_5$ and $T_7$ to calculate $E_{31}$.

$$(6)\qquad E_{32}\simeq\frac{-R_{133}}{1+\frac{(1-\alpha)R_{133}}{\alpha R_{132}}}\left[\frac{E_4M}{R_4'}+\frac{E_6M}{R_6'}+\frac{E_8M}{R_8'}\right]$$

$R_{133}$=impedance of feedback resistor 133.
$M$=arbitrary gain factor of the waveform signal sampling system.
$R_{132}$=impedance of resistor 132.
$\alpha$=common base current amplification factor of transistor $Q_{31}$.
$E_4$, $E_6$ and $E_8$ equal the relative voltage signals at terminals $T_4$, $T_6$ and $T_8$.
$R_4'$, $R_6'$ and $R_8'$ equal the impedance of the corresponding resistors.

Since a typical value for $\alpha$ is .98, Equation 6 may be written:

$$(7)\qquad E_{32}\simeq -R_{133}M\left[\frac{E_4}{R_4'}+\frac{E_6}{R_6'}+\frac{E_8}{R_8'}\right]$$

It should be observed that, in simplifying Equation 6 to Equation 7, it is assumed the impedances $R_{132}$ and $R_{133}$ are of the same order of magnitude and ideally equal; in one specific embodiment of the invention the impedances $R_{132}$ and $R_{133}$ are 22,000 and 25,000 ohms, respectively.

A similar equation may be written for the addition of currents by the second current amplifier comprising transistors $Q_{33}$ and $Q_{34}$ to provide the auto-correlation signal $E_{31}$ at terminal 31. It should be noted that the output $E_{32}$ of the first current summing amplifier is an input to the second current summing amplifier.

$$(8)\qquad E_{31}\simeq -R_{137}\left[\frac{E_{32}}{R_{135}}+\frac{E_3M}{R_3'}+\frac{E_5M}{R_5'}+\frac{E_7M}{R_7'}\right]$$

$R_{137}$=impedance of feedback resistor 137.
$M$=arbitrary gain factor of the waveform signal sampling system.
$R_{135}$=impedance of coupling resistor 135.
$R_3'$, $R_5'$ and $R_7'$ equal the impedances of the corresponding resistors.
$E_3$, $E_5$ and $E_7$ equal the relative voltage signals at terminals $T_4$, $T_6$ and $T_8$.

Substituting the value $E_{32}$ from Equation 7, Equation 8 may be written:

$$(9)\qquad E_{31}\simeq -R_{137}M\left\{\frac{-R_{133}}{R_{135}}\left[\frac{E_4}{R_4'}+\frac{E_6}{R_6'}+\frac{E_8}{R_8'}\right]+\frac{E_3}{R_3'}+\frac{E_5}{R_5'}+\frac{E_7}{R_7'}\right\}$$

$R_{133}$ is made equal to $R_{135}$, so that Equation 9 may be written:

$$(10)\qquad E_{31}\simeq -R_{137}M\left[\frac{E_3}{R_3'}-\frac{E_4}{R_4'}+\frac{E_5}{R_5'}-\frac{E_6}{R_6'}+\frac{E_7}{R_7'}-\frac{E_8}{R_8'}\right]$$

Substituting the value of resistance for the coupling resistors $R_3'$ to $R_8'$ and the relative signal sample voltages $E_3$ to $E_8$, $$(11)\qquad E_{31}\simeq\frac{R_{137}M}{K}\left[(3\times4.15)+(2\times2.77)+(5\times6.93)+(4\times5.54)+(2\times2.77)+(4\times5.54)\right]$$

$$E_{31}\simeq102.5K',\ \text{where}\ K'=\frac{R_{137}M}{K}$$

An equation similar to Equation 10 may be written for the correlation network 20 to calculate the cross-correlation output signal $E_{21}$ at the terminal 21 as follows:

$$(12)\qquad E_{21}\simeq -R_{127}M\left[\frac{E_2}{R_2}-\frac{E_3}{R_3}+\frac{E_5}{R_5}-\frac{E_6}{R_6}+\frac{E_7}{R_7}-\frac{E_8}{R_8}\right]$$

where $E_2$, $E_3$, $E_5$, $E_6$, $E_7$ and $E_8$ are the relative signal sample voltages at terminals $T_2$, $T_3$, $T_5$, $T_6$, $T_7$ and $T_8$ when the symbol 7 waveform is in the reference positioin and $R_2$, $R_3$, $R_5$, $R_6$, $R_7$ and $R_8$ equal the impedance of the corresponding coupling resistors. Substituting values in Equation 12, $$(13)\qquad E_{21}\simeq\frac{R_{127}M}{K}[(0\times9)-(3\times6)+(5\times1)+(4\times2)+(2\times2)+(4\times4)]$$

$$E_{21}\simeq15K'$$

Comparing the cross-correlation signal $E_{21}$ with the auto-correlation signal $E_{31}$, it can be seen that $E_{31}$ is greater: thus, the correlation network 31 has recognized its corresponding symbol 7 waveform by producing an auto-correlation signal, a signal greater than that of any other correlation network.

The foregoing operation of the correlation system according to the present invention will now be briefly described in general terms to illustrate that the auto-correlation signal is always greater than any cross-correlation signal. Assume a correlation system comprising a plurality of correlation networks, each designed to recognize a unique waveform and a waveform signal sampling means for simultaneously obtaining $n$ separate signal samples of the waveforms at $n$ terminals as each waveform is presented to the system for recognition. The sample voltages at the terminals and the sum of the squares of the sample voltages are tabulated below.

TABLE II

*Sample Voltages at Terminals*

| Printed Symbol | 1 | 2 | 3 | — | — | — | $n$ | Sum of Squares |
|---|---|---|---|---|---|---|---|---|
| A | $a_1$ | $a_2$ | $a_3$ | — | — | — | $a_n$ | $\sum_{i=1}^{n} a_i^2$ |
| B | $b_1$ | $b_2$ | $b_3$ | — | — | — | $b_n$ | $\sum_{i=1}^{n} b_i^2$ |
| — | — | — | — | — | — | — | — | — |
| Z | $z_1$ | $z_2$ | $z_3$ | — | — | — | $z_n$ | $\sum_{i=1}^{n} z_i^2$ |

Assuming that the relative energy content of the symbol A and B waveforms are to be normalized to the relative energy content of the symbol Z waveform, the auto-correlation signal $E_a$ from the network A and the cross-correlation signal $E_b$ from the network B may be determined when the symbol A waveform is sampled in its reference position in the following manner.

Consider $\bar{A}$ and $\bar{B}$ as vectors with $n$ dimensions or components, each component having a magnitude equal to the sample voltage at each of the $n$ terminals respectively. Then, $$\bar{A}=\sum_{i=1}^{n} a_i u_i \quad (14)$$

where $a_i$ is the sample voltage at the $i$th terminal and $u_i$ is a unit vector corresponding to the $i$th terminal, $u_i$ having the property that it is orthogonal to each of the other unit vectors. Thus, $u_i \cdot u_k=0$, if $i \neq k$ and $u_i \cdot u_k=1$, if $i=k$. This is the well-known dot or scalar product of vector algebra. Similarly, $$\bar{B}=\sum_{i=1}^{n} b_i u_i \quad (15)$$

Further, let $\bar{A}$ be associated with the printed symbol A, $\bar{B}$ with B, etc., and let the normalized signal sample be $$a_i'=a_i\sqrt{\frac{\bar{Z}\cdot\bar{Z}}{\bar{A}\cdot\bar{A}}} \quad (16)$$

where $$\bar{Z}\cdot\bar{Z}=\sum_{i=1}^{n} z_i z_i=\sum_{i=1}^{n} z_i^2, \text{ and}$$

$$\bar{A}\cdot\bar{A}=\sum_{i=1}^{n} a_i a_i=\sum_{i=1}^{n} a_i^2$$

the sum of the squares of the signal samples. Thus, Equation 16 is the general expression of Equation 3 for the signal samples normalized to the sum of the squares of the Z waveform signal samples, and the auto-correlation signal is $$E_a=\bar{A}\cdot\bar{A}' \quad (17)$$

where $\bar{A}'$ is a vector with normalized components $a_i'$ as given above, and $$\bar{A}'=\bar{A}\sqrt{\frac{\bar{Z}\cdot\bar{Z}}{\bar{A}\cdot\bar{A}}}=\bar{A}\frac{|Z|}{|\bar{A}|}$$

so that $$E_a=\bar{A}\cdot\left[\bar{A}\frac{|\bar{Z}|}{|\bar{A}|}\right]=|A||Z| \quad (18)$$

Similarly, the cross-correlation signal is:

$$E_b=\bar{A}\cdot\bar{B}' \quad (19)$$

where $$\bar{B}'=\sum_{i=1}^{n} b_i u_i\sqrt{\frac{\bar{Z}\cdot\bar{Z}}{\bar{B}\cdot\bar{B}}}=\bar{B}\frac{|\bar{Z}|}{|\bar{B}|}$$

so that $$E_b=\bar{A}\cdot\left[\bar{B}\frac{|\bar{Z}|}{|\bar{B}|}\right]=|\bar{A}||\bar{Z}|\cos(\bar{A},\bar{B}) \quad (20)$$

In an $n$-dimensional space, the cosine factor has the property that:

$$\text{Cos}(\bar{A},\bar{B})=\frac{\bar{A}\cdot\bar{B}}{|\bar{A}||\bar{B}|}=\frac{\sum_{i=1}^{n} a_i b_i}{\sqrt{\sum_{i=1}^{n} a_i^2}\sqrt{\sum_{i=1}^{n} b_i^2}}$$

In a two or three dimensional space, this would be the cosine of the angle between the two vectors. When the analogy is made in our $n$-dimensional space to the "angle" between the two vectors, as defined above, it can be seen that $-1 \leq \cos(\bar{A},\bar{B}) \leq +1$. The $\cos(\bar{A},\bar{B})$ has its maximum value when $\bar{A}=\bar{B}$; i.e., when the "angle" is zero. It has its smallest value when $\bar{A}=-\bar{B}$. For all other possibilities of $\bar{A}$ and $\bar{B}$, $$\text{Cos}(\bar{A},\bar{B})<1$$

so that the expressions of Equations 18 and 20 will lead to the following result:

$$|E_b| \leq |E_a|$$

However, by the definition of the signals, $\bar{A}$ is not equal to $\bar{B}$ and $$\sum_{i=1}^{n} a_i^2 \neq \sum_{i=1}^{n} b_i^2$$

so that $\bar{A}$ is not equal to $-\bar{B}$. Therefore, it is verified that $E_a > E_b$ whenever the waveform A is being analyzed.

In the foregoing general example the waveform was considered to be in its reference position. At that time the output signal $E_a$ from the auto-correlation network A will reach its maximum magnitude because at that time the vector $$\sum_{i=1}^{n} a_i u_i$$

reaches its maximum amplitude and is coincident with the vector $$\sum_{i=1}^{n} a_i u_i\sqrt{\frac{\sum_{i=1}^{n} z_i^2}{\sum_{i=1}^{n} a_i^2}}$$

which is stored in the auto-correlation network A in the form of relative impedance values in the manner described above in connection with Equation 4. The output signal $E_b$ from the auto-correlation network B may or may not reach its maximum amplitude at that time; the maximum in that network may well occur before the waveform has been completely developed. But, regardless of when the maximum amplitude is reached in the cross-correlation network, that maximum must always be less than that of the auto-correlation because the vector $$\sum_{i=1}^{n} a_i u_i$$

never coincides with the stored vector $$\sum_{i=1}^{n} b_i u_i\sqrt{\frac{\sum_{i=1}^{n} z_i^2}{\sum_{i=1}^{n} b_i^2}}$$

in the symbol B correlation channel. Hence, to identify the waveform it is only necessary to ascertain which correlation network has recognized the symbol waveform. That is done by comparing the amplitudes of the output correlation signals.

Figure 5:
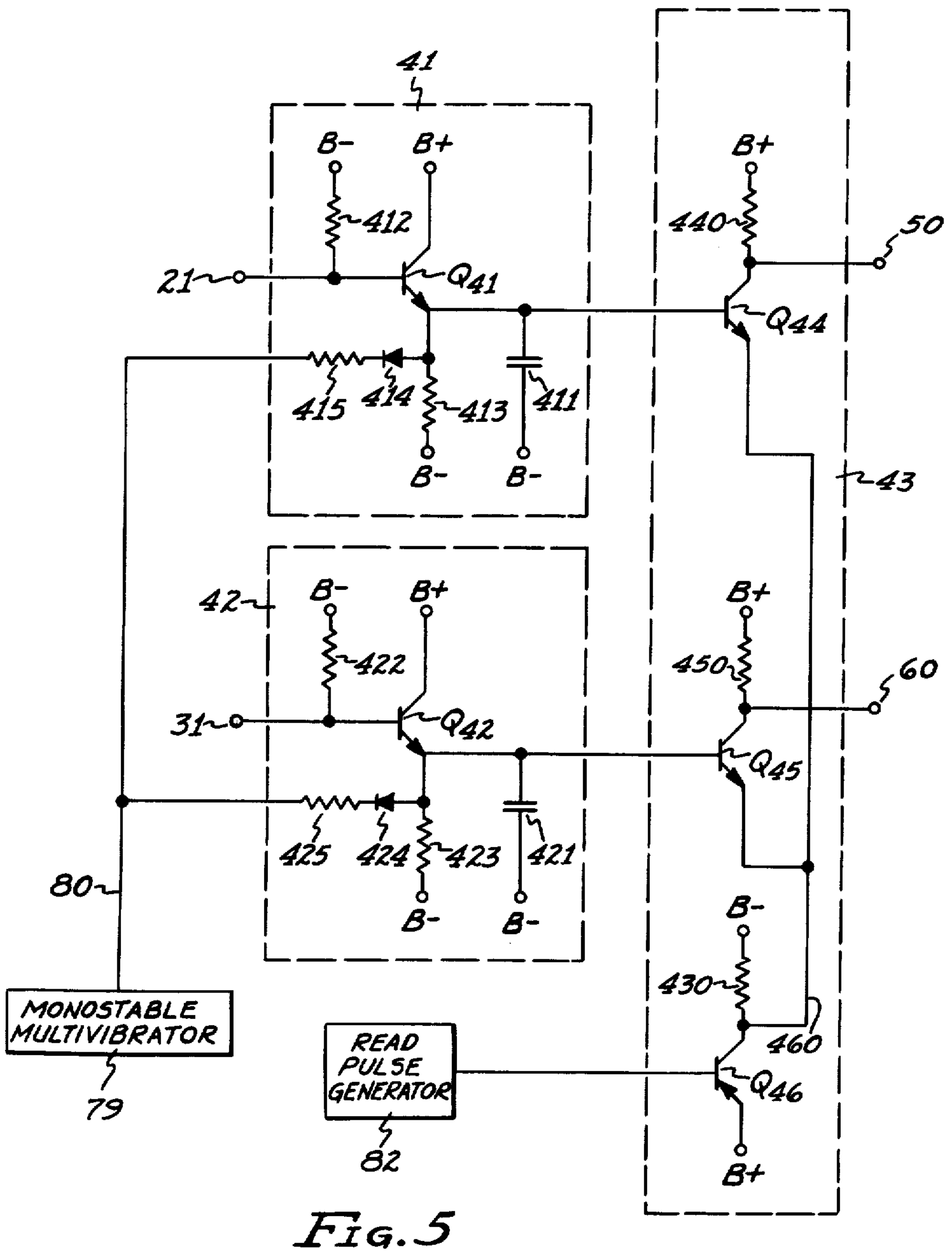
FIG. 5 is a schematic diagram of a peak detector and comparator circuit.

Referring now to FIG. 5, the peak detector and comparator circuit 40 will be described. Since both peak detectors 41 and 42 are the same, only one, the peak detector 41, will be described in detail, but obviously there should be as many peak detectors as there are correlation networks, one for each correlation network.

The output terminal 21 of the correlation network 20 is coupled to a storage capacitor 411 in the peak detector 41 by an emitter-follower circuit comprising an NPN transistor $Q_{41}$. The base of the transistor $Q_{41}$ is connected to a source of negative direct voltage through a resistor 412 and to the terminal 21. The collector of the transistor $Q_{41}$ is connected to a source of positive direct voltage. The emitter is connected to the capacitor 411 and to a source of negative direct voltage through a resistor 413. The other side of the capacitor is connected to a source of negative direct voltage. When the positive going correlation signal is applied to the base of the transistor $Q_{41}$, the emitter potential follows and charges the capacitor 411.

The emitter of transistor $Q_{41}$ is clamped to a negative potential through resistor 415 and diode 414 except when the monostable multivibrator 79 is triggered into its quasi-stable state by a waveform presence signal as previously described in connection with FIG. 1. Thus, a correlation signal voltage charge is not stored in the capacitor during the selected period established by the quasi-stable state of the monostable multivibrator 79 which is triggered just before the waveform is in its reference position. When the monostable multivibrator 79 is triggered, the cathode of the diode 414 is driven positive with respect to the anode of the diode 414. This cuts off the conduction of current through the diode 414, thereby enabling the capacitor 411 to charge and store the maximum signal amplitude translated from the terminal 21 to the capacitor 411 by the emitter-follower. The capacitor 411 charges through the low impedance of the base-to-emitter diode of transistor $Q_{41}$ and discharges slowly through the resistor 413 after the maximum signal amplitude has passed. The R-C time constant of the resistor 413 and the capacitor 411 is relatively large so that the maximum signal amplitude is substantially stored in the capacitor 411.

The output terminal 31 of the correlation network 30 is similarly coupled to a capacitor 421 in the detector 42. The capacitor 421 stores the maximum signal amplitude developed by the correlation network 30. All of the peak detectors provided are controlled by the monostable multivibrator 79 through the lead 80.

The capacitors 411 and 421 are also connected to the comparator circuit 43 which includes two NPN transistors $Q_{44}$ and $Q_{45}$ connected as amplifier circuits having a common emitter circuit through a resistor 430 and a PNP transistor $Q_{46}$ having its collector connected to a source of negative potential through the resistor 430. The emitter of transistor $Q_{46}$ is connected to a source of positive potential and the base is connected to the read pulse generator 82 which normally holds the transistor $Q_{46}$ conducting, preferably at or near saturation.

The transistors $Q_{44}$ and $Q_{45}$ have their collectors connected to a source of positive direct potential through resistors 440 and 450. The current through the transistor $Q_{46}$ and the resistor 430 is sufficient to hold the transistors $Q_{44}$ and $Q_{45}$ cut off until the voltage amplitude of the signals stored in the capacitors 411 and 421 are to be compared.

Shortly after the waveform is stored in its reference position, the read pulse generator 82 is triggered to provide a large positive pulse of short duration as described with reference to FIG. 1. That positive pulse cuts the transistor $Q_{46}$ off which thereby tends to allow the potential of the common emitter circuit of transistors $Q_{44}$ and $Q_{45}$ to change in a negative direction. Whichever transistor ($Q_{44}$ or $Q_{45}$) has its base connected to the capacitor (411 or 421) storing the largest voltage signal will then conduct thereby causing current to flow through the resistor 430. This current flow holds the other transistor at cutoff. Thus, it can be seen that the collector potential of only one transistor, transistor $Q_{44}$ or $Q_{45}$, will change in a negative direction when a read pulse is applied to the transistor $Q_{46}$, depending upon which capacitor has the largest voltage signal stored. In this way the waveform recognized is identified with one of the terminals 50 and 60 which are connected to the collectors of respective transistors $Q_{44}$ and $Q_{45}$.

Only two transistors, $Q_{44}$ and $Q_{45}$, have been shown in the comparator circuit for comparing two correlation signals. Additional transistors may be connected in a similar manner to lead 460 for additional correlation signals to be compared.

A brief example will help to clarify the function of the peak detectors and the comparator circuit. Assume that a symbol 6 waveform is being recognized by the novel correlation network 20 of FIG. 4 so that an auto-correlation signal from that network is applied to terminal 21. At the same time, a cross-correlation signal from the novel correlation network 30 is applied to terminal 31. When the waveform presence signal triggers the monostable multivibrator 79 the capacitors 411 and 421 will charge in a positive direction. Capacitor 411 will be charged by the auto-correlation signal which is greater in amplitude than the cross-correlation signal charging the capacitor 421. The read pulse generator 82 is then triggered and the transistor $Q_{46}$ is cut off; that allows only transistor $Q_{44}$ to conduct because conduction of transistor $Q_{44}$ holds the transistor $Q_{45}$ at cut off. A negative going signal appears at terminal 50 in response to the condition of transistor $Q_{44}$ which, by design, is associated with the symbol 6 waveform correlation network. Thus, the waveform recognized by the correlation network 20 is identified as representative of the symbol 6 by the peak detector and comparator circuit 40. When the monostable multivibrator 79 returns to its stable condition, the capacitors 411 and 421 discharge through the diodes 413 and 423. In that manner the peak detectors 410 and 420 are reset before the next waveform to be recognized is stored in the delay line in its reference position.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefor intended to cover and embrace any such modifications, within the limits only of the true spirit and scope of the invention.

What is claimed is:

1. In a system for recognizing each of a plurality of different waveforms, apparatus comprising: a plurality of networks equal in number to the number of different waveforms, each of said networks corresponding to one of said waveforms; sampling means having an input terminal for receiving any one of said waveforms and a plurality of output terminals for delivering a plurality of discrete signal samples of said waveform; a current summing means in each network; and impedance means connected between certain of said output terminals and said current summing means, the quantity of impedance of each impedance means being inversely proportional to the discrete signal sample of the corresponding waveform delivered thereto and directly proportional to the energy content of the corresponding waveform.

2. In a system for recognizing each of a plurality of different waveforms, apparatus comprising: means for receiving any one of said waveforms and for applying a plurality of discrete signal samples of said waveforms to output terminals; and a plurality of networks equal in number to the number of said different waveforms, each network corresponding to one of said waveforms and including a plurality of impedance means having a first and second terminal, said first terminal of each impedance means being connected to one of said output terminals, and a current summing means connected to the second terminal of each of said impedance means, the quantity of impedance of each of said impedance means being inversely proportional to the discrete signal sample of the corresponding waveform applied to the output terminal to which it is connected and directly proportional to the energy content of said corresponding waveform.

3. In a system for recognizing each of a plurality of different electrical waveforms, apparatus comprising: a plurality of networks equal in number to the number of said different waveforms, each of said networks corresponding to one of said waveforms and having a plurality of terminals; a delay line for receiving any one of said waveforms and for delivering a plurality of voltage samples of said signal waveform, which are positive and negative with respect to a reference, to said plurality of terminals; each network including a current summing means having two input terminals and one output terminal; a first plurality of impedance elements, each connected between one of said plurality of terminals receiving a voltage sample of one polarity from said corresponding waveform and one input terminal of said current summing means; and a second plurality of impedance elements, each connected between one of said plurality of terminals receiving a voltage sample of the other polarity from said corresponding waveform and the other input terminal of said current summing means; the quantity of impedance of each of said first and second plurality of impedance elements being inversely proportional to a particular discrete voltage sample delivered to each corresponding terminal of said plurality of terminals when the corersponding waveform is stored in its reference position in the delay line and directly proportional to the energy content of said corresponding waveform.

4. An apparatus as in claim 3 wherein said current summing means comprises a first and second current summing amplifier, each having an input terminal, an output terminal and a negative feedback impedance means, said first plurality of impedance means being connected to the input terminal of said first current summing amplifier, said second plurality of impedance means being connected to the input terminal of said second current summing amplifier, and impedance means connecting said first and second current summing amplifiers in cascade to cause said second current summing amplifier to deliver at its output terminal a signal proportional to the sum of the amplitudes of said positive and negative sample voltages.

5. An apparatus as in claim 4 wherein the quantity of impedance of said negative feedback impedance means is approximately equal to the quantity to impedance of said impedance means connecting said first and second current summing amplifiers in cascade.

6. An apparatus as in claim 4 wherein each of said first and second current summing amplifiers comprises a transistor amplifier circuit.

7. An apparatus as in claim 6 wherein the negative feedback impedance means in said first and second current summing amplifiers comprises a transistor emitter-follower circuit.

8. In an auto-correlation network designed to recognize a particular electrical waveform, a plurality of impedance means, each having a first terminal adapted to simultaneously receive a discrete sample of the electrical waveform to be recognized and a second terminal connected to a current summing means adapted to combine currents conducted by said plurality of impedance means, the quantity of impedance of each impedance means being inversely proportional to the discrete sample received at its first terminal and directly proportional to the energy content of the electrical waveform.

9. An apparatus as in claim 8 wherein said current summing means includes a current summing amplifier having a negative feedback impedance means.

10. An apparatus as in claim 9 wherein the current summing amplifier comprises a transistor amplifier circuit.

11. An apparatus as in claim 10 wherein the negative feedback impedance means comprises a transistor emitter-follower circuit.

12. In a system designed to recognize a plurality of electrical waveforms, a plurality of atuo-correlation networks, each network being designed to recognize a particular electrical waveform and including a plurality of impedance means, each having a first terminal adapted to simultaneously receive a discrete sample of the electrical waveform to be recognized and a second terminal connected to a current summing means adapted to combine currents conducted by said plurality of impedance means, the quantity of impedance of each impedance means being inversely proportional to the discrete sample received of the waveforms to be recognized and directly proportional to the energy content of the waveform to be recognized.

13. In an auto-correlation network designed to recognize a particular electrical waveform, apparatus comprising: a first plurality of impedance means having a first terminal adapted to receive discrete samples of the electrical waveform to be recognized of one polarity with respect to a reference and a second terminal connected to a first current summing amplifier adapted to combine and invert currents conducted by said first plurality of impedance means having a first terminal adapted to receive discrete samples of the electrical waveform to be recognized of an opposite polarity with respect to said reference and a second terminal connected to a second current summing amplifier adapted to combine currents conducted by said second plurality of impedance means; said first and second plurality of impedance means receiving said discrete samples simultaneously and each of said impedance means having a quantity of impedance inversely proportional to the discrete sample received at its first terminal and directly proportional to the energy content of the electrical waveform to be recognized; and an impedance means connected between the first and second current summing means for translating the combined currents of said first current summing amplifier to the second current summing amplifier to cause said second current summing amplifier to combine the combined and inverted currents of said first current summing amplifier with the currents conducted by said second plurality of impedance elements.

14. An apparatus as in claim 13 wherein each of said first and second current summing amplifiers comprises a direct current amplifier and a negative feedback impedance means.

15. An apparatus as in claim 14 wherein said direct current amplifier comprises a single transistor amplifier.

16. An apparatus as in claim 15 wherein said negative feedback impedance means comprises a single transistor emitter-follower circuit.

17. In a system for recognizing each of a plurality of different waveforms, apparatus comprising: a plurality of networks equal in number to the number of different waveforms, each of said networks corresponding to one of said waveforms; a delay line storage means having an input terminal for receiving any one of said waveforms and a plurality of output terminals for delivering a plurality of discrete signal samples of said waveform; a current summing means in each network; impedance means connected between certain of said delay line output terminals and said current summing means, the quantity of impedance of each impedance means being inversely proportional to a particular discrete signal sample delivered to each corresponding impedance means when the corresponding waveform is stored in its reference position in the delay line and directly proportional to the energy content of that corresponding waveform.

18. In a system for recognizing each of a plurality of different electrical waveforms, apparatus comprising: a plurality of networks equal in number to the number of said different waveforms, each of said networks corresponding to one of said waveforms and having a plurality of terminals; means for receiving any one of said waveforms and for delivering a plurality of positive and negative voltage samples of said signal waveform to said plurality of terminals; each network including a current summing means having two input terminals and one output terminal; a first plurality of impedance elements, each connected between one of said plurality of terminals receiving a voltage sample of one polarity from said corresponding waveform and one input terminal of said current summing means; and a second plurality of impedance elements, each connected between one of said plurality of terminals receiving a voltage sample of the other polarity from said corresponding waveform and the other input terminal of said current summing means; the quantity of impedance of each of said first and second plurality of impedance elements being inversely proportional to the discrete voltage sample delivered to each corresponding terminal of said plurality of terminals when the corresponding waveform is sampled and directly proportional to the energy content of said corresponding waveform.

19. In a system for recognizing a plurality of different waveforms, apparatus comprising: sampling means for receiving a given one of said waveforms and in response thereto for providing a plurality of discrete signal samples of said given waveform, a plurality of correlation networks, one network for each different waveform to be recognized, a given network being provided to recognize a particular waveform, said given network including a plurality of multiplying means, one multiplying means for each signal sample of the particular waveform to be recognized by said given network, a given multiplying means being provided to simultaneously multiply a given discrete signal sample of the particular waveform to be recognized by a combined auto-correlation and normalizing coefficient, and summing means for summing the normalized and correlated signal samples, whereby each signal sample of said given waveform to be recognized is multiplied in said given correlation network by a coefficient according to the energy content in said given waveform relative to an arbitrary norm and by a coefficient according to the amplitude of the signal sample such that the sum of the normalized and correlated signals will be approximately equal to a predetermined value in the network for recognizing said given waveform and greater than the sum produced by all the other correlation networks provided to recognize other waveforms.

References Cited in the file of this patent

UNITED STATES PATENTS

| | | |
|---|---|---|
| 2,691,074 | Eberhard | Oct. 5, 1954 |
| 2,801,296 | Blecher | July 30, 1957 |
| 2,897,481 | Shepard | July 28, 1959 |
| 2,898,576 | Bozeman | Aug. 4, 1959 |
| 2,921,738 | Greening | Jan. 19, 1960 |
| 2,959,741 | Murray | Nov. 8, 1960 |

OTHER REFERENCES

Teaching Machines to Read by K. R. Eldredge et al.; SRI Journal, first quarter, 1957, pp. 18–23.

UNITED STATES PATENT OFFICE

CERTIFICATE OF CORRECTION

Patent No. 3,111,645 November 19, 1963

Richard E. Milford

It is hereby certified that error appears in the above numbered patent requiring correction and that the said Letters Patent should read as corrected below.

Column 2, line 35, strike out "up"; column 9, line 70, for "ce recognized" read -- be recognized --; column 10, line 48, for "$Q_{31}$" read -- $Q_{32}$ --; column 16, line 16, for "condition" read -- conduction --; column 17, line 68, for "atuo-correlation" read -- auto-correlation --.

Signed and sealed this 9th day of June 1964.

(SEAL)
Attest:

ERNEST W. SWIDER
Attesting Officer

EDWARD J. BRENNER
Commissioner of Patents